United States Patent [19]
Giebeler

[11] 3,922,009
[45] Nov. 25, 1975

[54] COUPLING

[75] Inventor: Ben F. Giebeler, San Bernardino, Calif.

[73] Assignee: Byron Jackson Inc., Long Beach, Calif.

[22] Filed: July 5, 1974

[21] Appl. No.: 485,851

[52] U.S. Cl. .................. 285/87; 85/1 L; 85/32 V; 285/376; 285/391
[51] Int. Cl.² ....................................... F16L 37/24
[58] Field of Search ............ 285/87, 391, 401, 402, 285/376, 361, 360, 92; 403/348, 349; 85/1 L, 32 V

[56] References Cited
UNITED STATES PATENTS

| | | | |
|---|---|---|---|
| 1,372,238 | 3/1921 | Kreiter | 285/391 X |
| 1,685,619 | 9/1928 | Welsh | 285/87 X |
| 2,111,859 | 3/1938 | Kennedy | 285/361 X |
| 2,228,243 | 1/1941 | Baker | 285/376 X |
| 2,673,751 | 3/1954 | Finch | 285/391 X |
| 2,695,797 | 11/1954 | McCarthy | 285/391 X |
| 3,098,667 | 7/1963 | Greenwood | 285/376 |
| 3,442,536 | 5/1969 | Fowler | 285/391 X |

Primary Examiner—Thomas F. Callaghan
Attorney, Agent, or Firm—John O. Evans, Jr.

[57] ABSTRACT

A coupling or connector comprises a mating male member and a female member each being provided with circumferentially and laterally spaced, interrupted threads, cams or lugs having no lead angle. The male member is fully seated in the female member with the threads, cams or lugs so positioned that upon rotation of one member relative to the other for a few degrees in one direction, the threads, cams or lugs interlock or mesh with one another. When positioned for rotation, stop lugs, threads or cams are substantially circumferentially aligned, so as to not only limit the relative rotation between the members but also the direction in which the members can be rotated relative to one another. To disconnect the members, the rotation is reversed. The connector is especially adaptable for use with a cementing head through which cement is supplied to a casing of an oil well. The intermeshing of the threads provides tension and compression bearing surfaces. A locking means is associated with the head for locking the head against rotation when attached to the casing. Cooperating stop lugs on each of the members are threadedly engaged with the threads on the other of said members when the members are releasably coupled together to thereby augment the interengaged surface area of the members and thus the strength of the joint.

14 Claims, 11 Drawing Figures

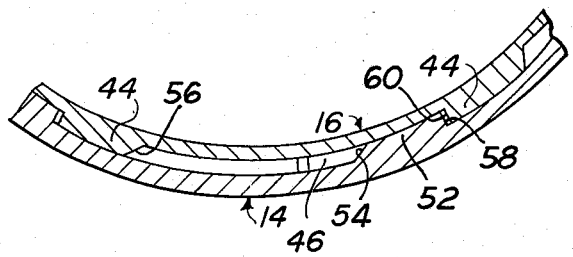
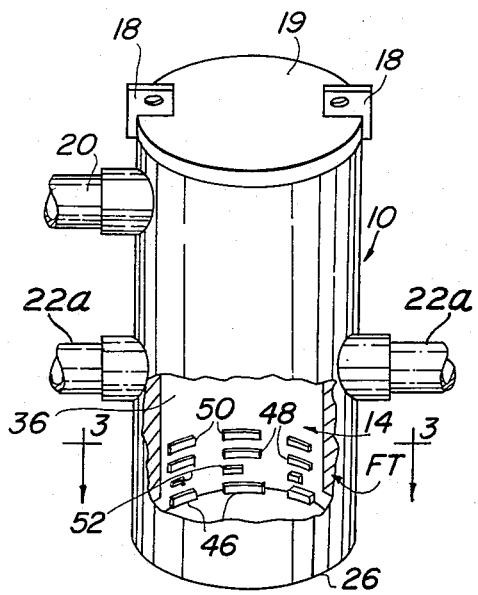
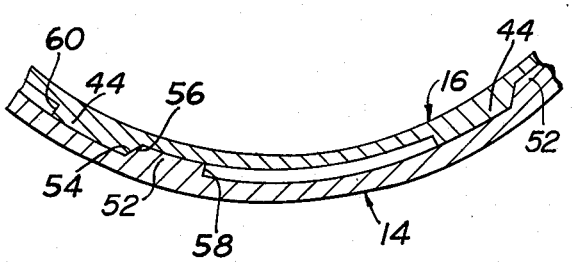
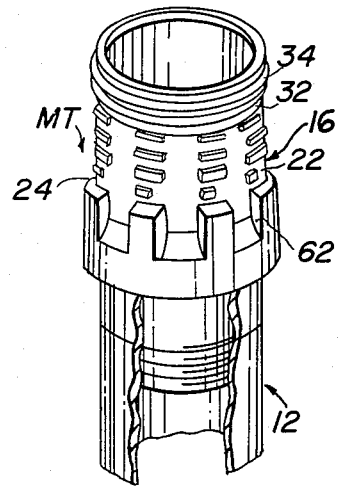

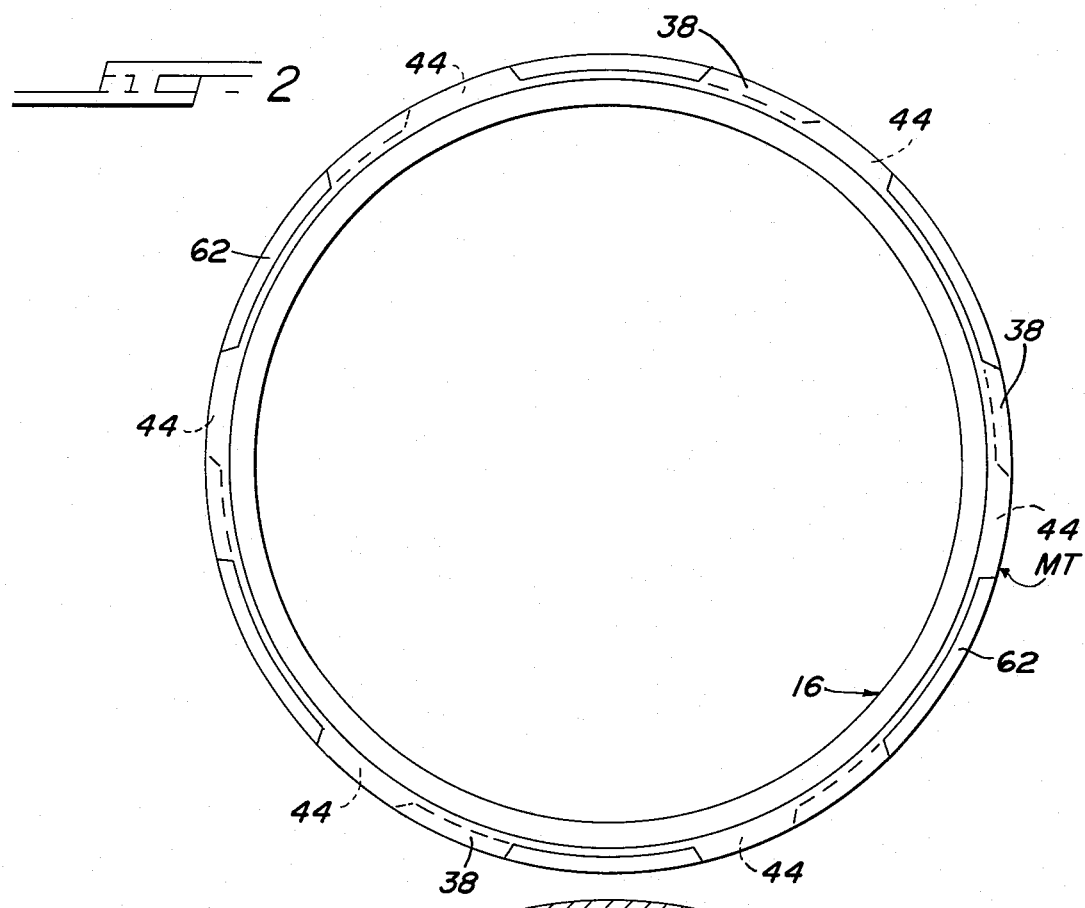
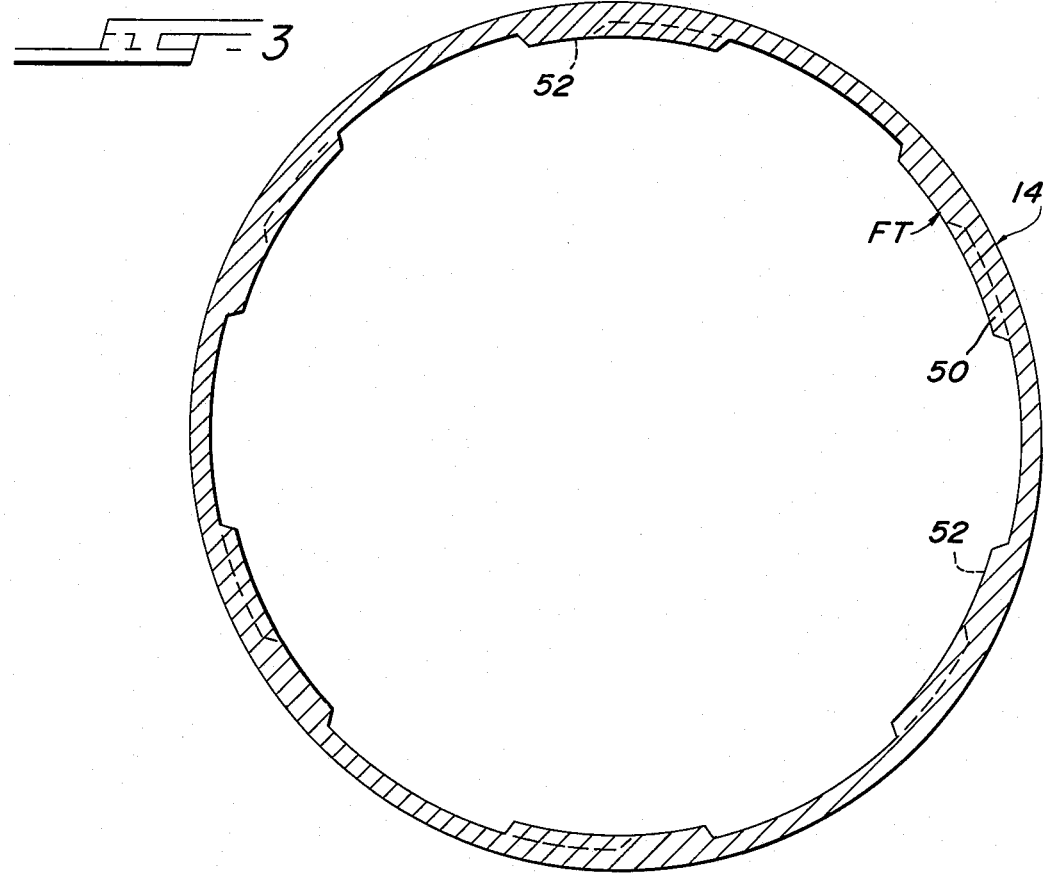

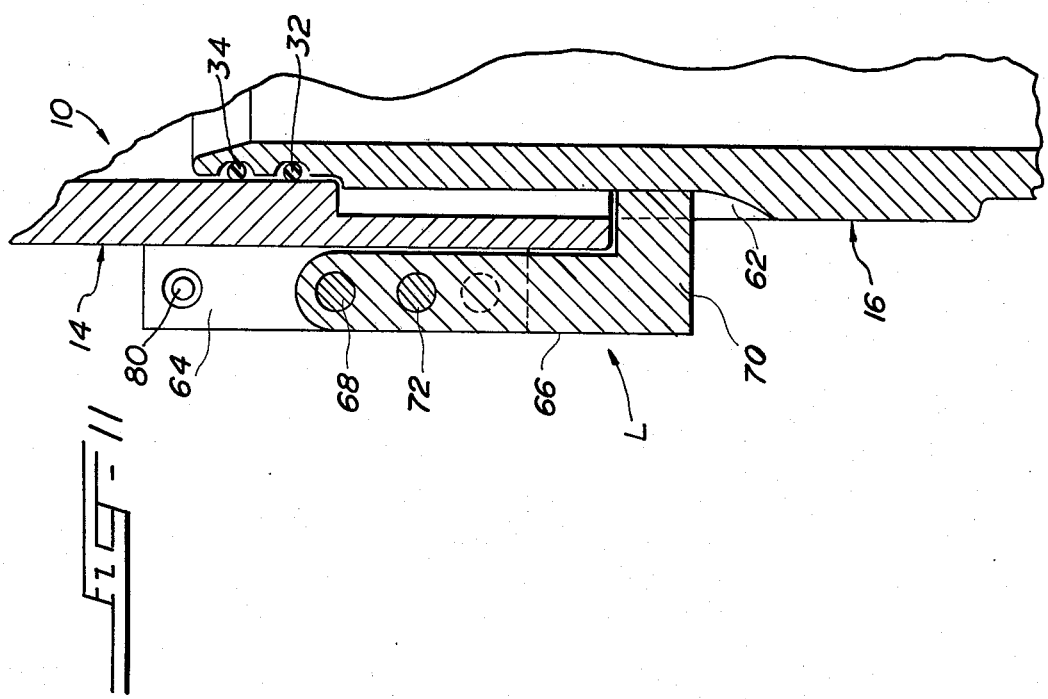
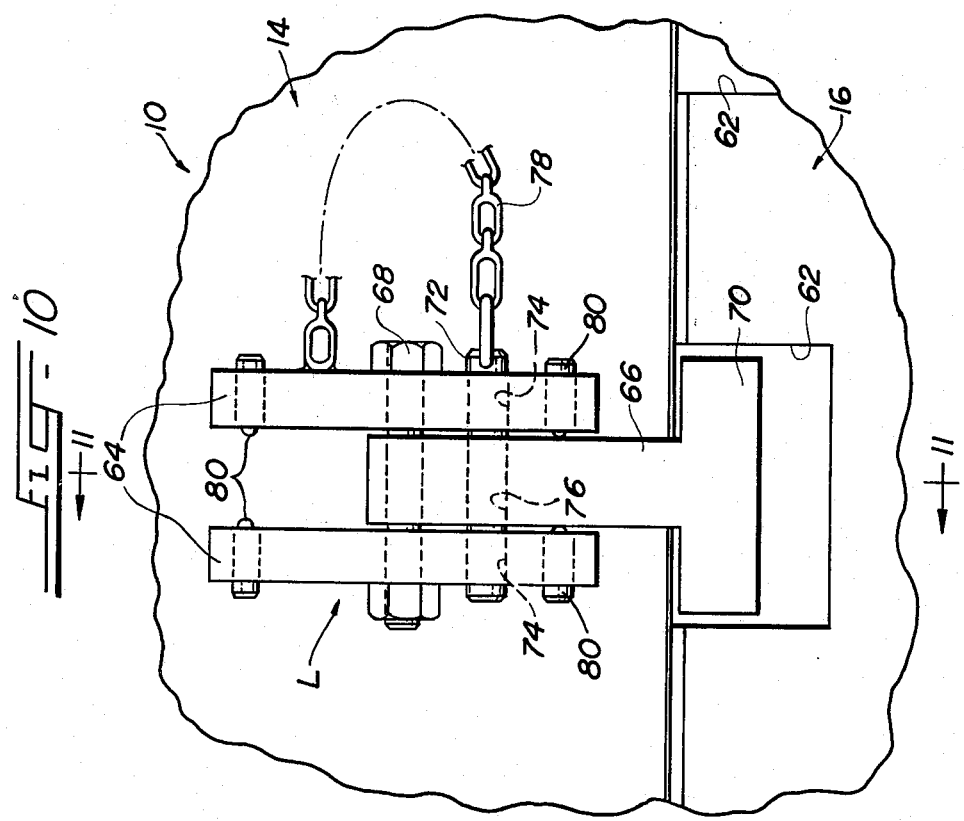

COUPLING

BACKGROUND OF THE INVENTION

Couplings or connectors for joining cylindrical members together quickly are well known in the art. Some of these couplings are provided with interrupted threaded male and female members, so that when the male member is properly seated in the female member and rotated, the threads mesh and couple the members together.

Couplings and connectors of this type find use in oil-field operations. For example, a cementing head is coupled to a casing for cementing a well. The cylinders in this example are generally very large and the cementing head is large, bulky, and heavy. The head is quickly lowered and guided into engagement with the casing, rotated and the head and casing are coupled together, so that cement can be discharged into the casing.

In many of these couplings, the threads are provided with a lead angle or with a locking taper, so as to provide a seal. In some, the head may be rotated in either direction for providing the connection.

THE INVENTION

According to this invention, there is provided a coupling or connector comprising a mating male member and a female member, each being provided with circumferentially and laterally spaced interrupted threads, cams, or lugs. Each thread, cam, or lug has bearing surfaces extending substantially normal to the walls of the respective member and has no lead angle.

The male member to be coupled to the female member must be fully seated in the female member. When so seated, the threads, cams, or lugs on the two members are so positioned relative to one another that upon rotation of the male member relative to the female member for a few degrees, for example, about 30°, the threads, cams, or lugs interlock or mesh with one another.

When properly positioned relative to one another, cooperating stop lugs, threads, or cams on both members are circumferentially aligned, so that upon rotation of the male member, the relative rotation between the members is limited. These stop lugs, threads or cams are also effective to prevent the rotation of the male member relative to the female member in the opposite direction for coupling the members together. Thus, rotation for coupling is limited to one direction only. Rotation in the opposite direction uncouples the members, whereupon the male member may be lifted from registry with the female member.

When in use in cementing a well, there are provided locking means associated with the cementing head which engage recesses in the coupling attached to the casing, so as to prevent rotation of the head in either direction; thus, until the locking means are disengaged, the head cannot be uncoupled from the casing. The cementing head is provided with means to releasably support a cementing plug for the well cementing operation.

In brief, the connector or joint of the invention includes: a male cylindrical member; a female cylindrical member; said male member being insertable into the female member a predetermined distance, a plurality of axially spaced and circumferentially interrupted threads, on each member which mesh with one another upon rotation of one of said members to releasably couple said members together; and circumferentially spaced stop lugs on each of said members which are circumferentially aligned with one another when said male member is at said predetermined distance in said female member to limit the rotation of said members relative to one another to a portion of a revolution equal in distance to the length of one of said threads, and to permit rotation of said members relative to the other in one direction only for coupling said members and in the opposite direction only for uncoupling said members; and wherein said stop lugs on each of said members are threadedly engaged with the threads on the other of said members when said members are releasably coupled together to thereby augment the interengaged surface area of said members and thus the strength of the joint.

THE DRAWINGS

FIG. 1 is an exploded illustration of a cementing head with a female coupling and a casing with a male coupling attached (shown partially in section), the couplings being constructed according to the invention;

FIG. 2 is a top view of the male coupling member;

FIG. 3 is a horizontal sectional view through the female coupling member taken along the line 3—3 of FIG. 1;

FIG. 8 is a partial sectional view showing the stop threads in the disengaged positions and taken along the line 8—8 of FIG. 4;

FIG. 9 is a partial sectional view showing the stop threads in the engaged position and taken along the line 9—9 of FIG. 6;

FIG. 10 is an illustration of the locking means;

FIG. 11 is a sectional view through line 11—11 of FIG. 10.

DETAILED DESCRIPTION

Figure 4:
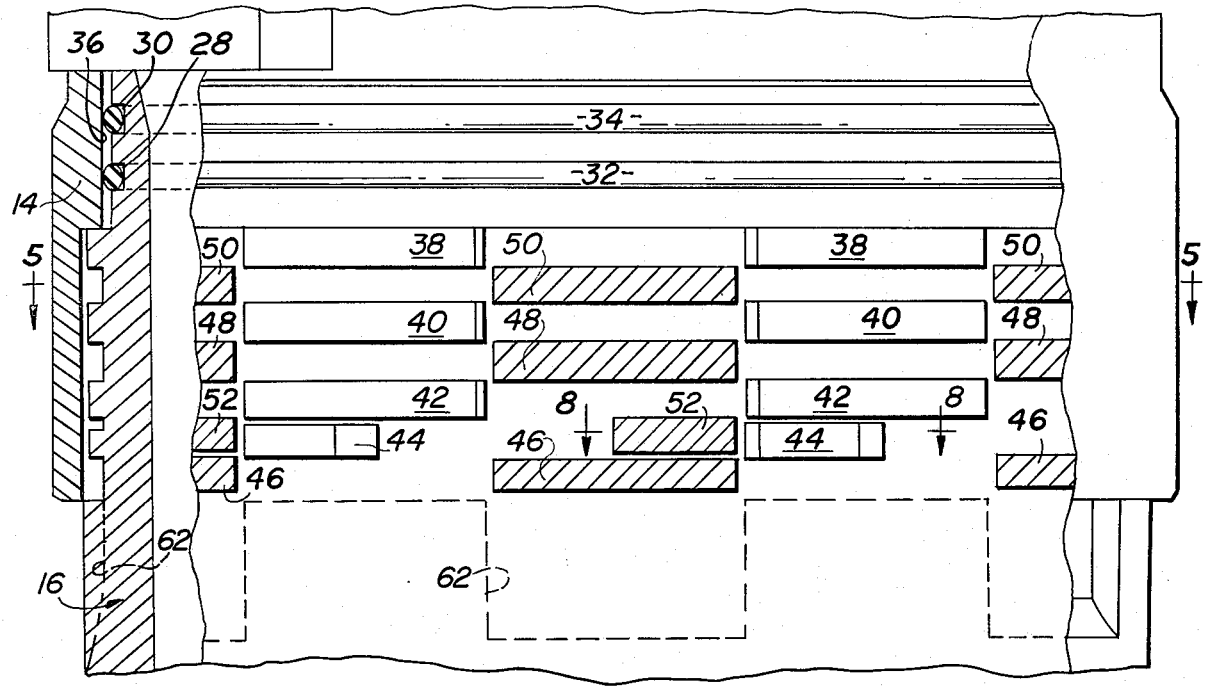
FIG. 4 is an illustration of the female member in position upon the male member preparatory to rotation of the female member for engaging the threads, the female member being partly cut away to expose the forward surface of the male member, the threads of the female member being shown in phantom.
Figure 6:
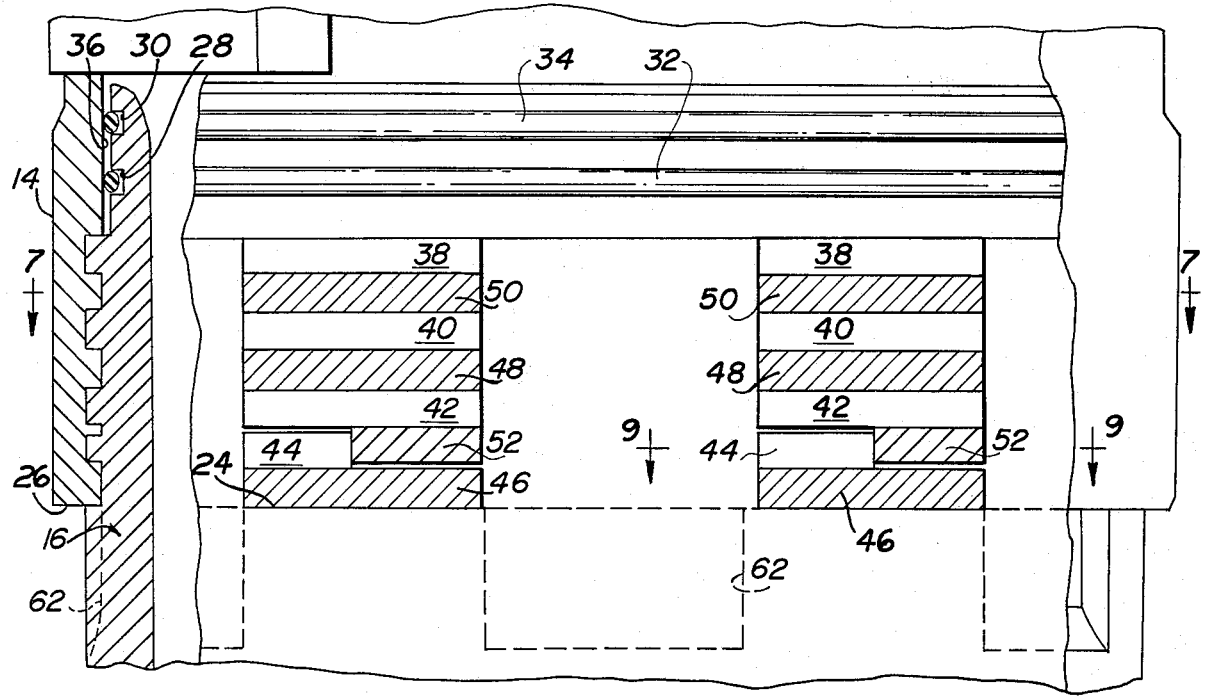
FIG. 6 is an illustration similar to FIG. 4, but showing the female member rotated clockwise, looking down, and in a position in which the threads of the members are interengaged.
Figure 5:
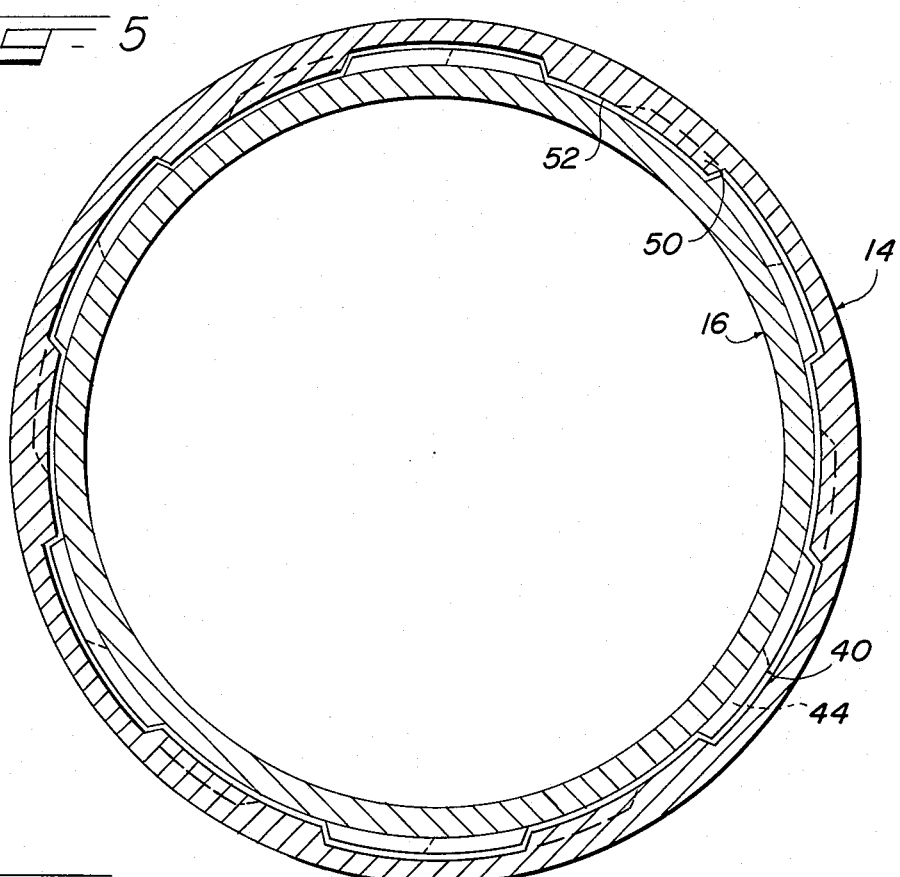
FIG. 5 is a view on line 5—5 of FIG. 4 through the coupling in the FIG. 4 position.
Figure 7:
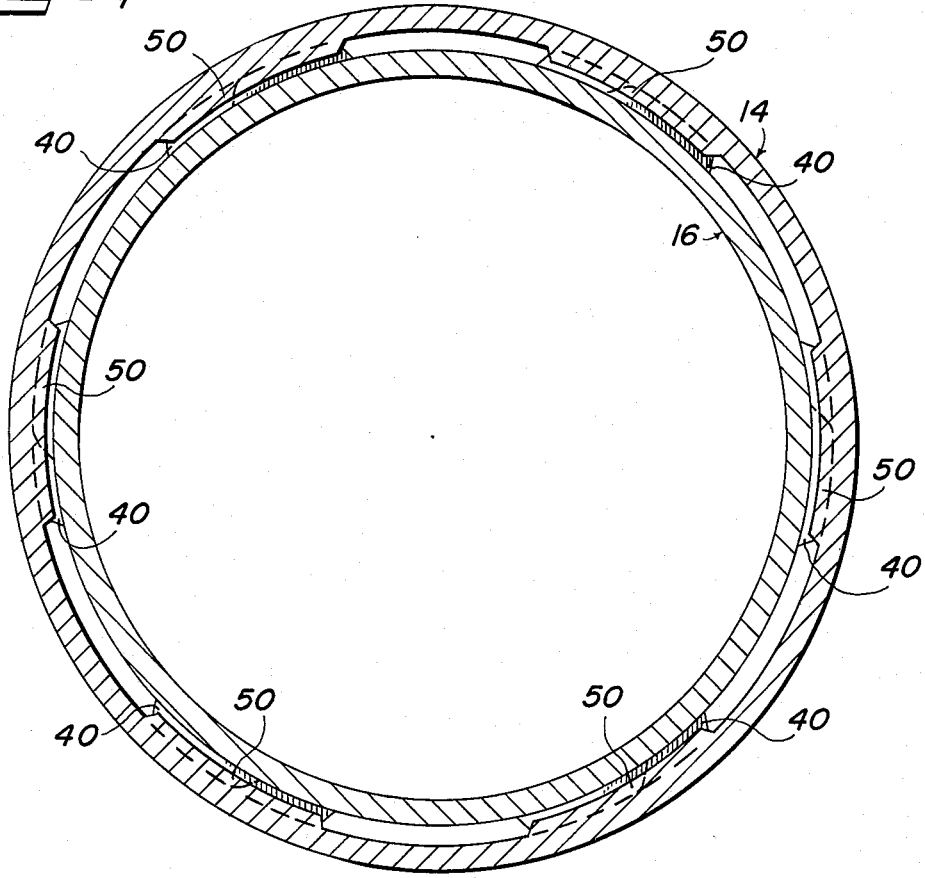
FIG. 7 is a view on line 7—7 of FIG. 6 through the coupling in the FIG. 6 position.

Referring now to the drawings and especially FIG. 1, there is illustrated a cementing head 10 and a casing 12. The cementing head has a female coupling or connector portion 14 and the casing 12 has a male coupling or connector 16 affixed thereto. The couplings or connector 16 is affixed to the casing 12 in any well known manner. For example, in the specific structure illustrated, they are joined by screw threads. The cementing head may be constructed to have a coupling connected thereto in a like manner, if so desired.

The cementing head 10 is lifted and moved by hooks or the like of a hoist or elevator (not shown) which engage brackets 18 fastened to the head 19 which is threadably and thus removably connected to the member 14. Cement is fed to the cementing head through a conduit 20; a valve may be provided, so as to control the flow of cement from a suitable source (not shown)

to the head and thence to the casing 12.

The head is provided with fittings 22a to receive plug pins (not shown) which support a cementing plug (also not shown) in the cementing head for the cementing operation. Removal of the pins releases the plug, so that it can be driven down into and through the casing by the flow of cement slurry into the cementing head through the conduit 20.

The connector or coupling of this invention comprise the female coupling portion 14 and the male coupling 16. The male coupling 16 is provided with a reduced diameter portion 22 which terminates in a shoulder 24, which when inserted into the female coupling seats on a terminal flange 26 of the female coupling.

The reduced diameter portion of the male coupling 16 is provided with a pair of grooves 28, 30 adjacent its terminal end, each to receive a resilient O-ring 32, 34, respectively, so as to provide a relatively fluid tight seal with a cylindrical portion 36, of the female coupling 14. While a pair of O-rings are shown, the number can be different without departing from the spirit of the invention.

As is illustrated, the male member 16 is provided with a plurality of interrupted, circumferentially spaced threads, cams or lugs without a lead angle and generally identified as MT. As shown there are axial series of threads identified as 38, 40, and 42 and a series of stop threads 44.

The threads 38, 40, and 42 in the preferred embodiment are axially aligned with one another and each has an extent or length substantially equal to the arc defined by a central angle of about 30°. They are spaced about 30° from the next adjacent thread of the same series. The axial spacing of one series from the next is by a distance approximately each to the width of each thread. Each of the stop lugs of the stop lug series 44 has one end aligned with the end of the threads MT; however the length is much smaller than the threads MT, for example, on the order of one-half. The stop lugs are spaced from the shoulder 24 a distance equal to the width of a thread and are closely adjacent to the threads 42.

The female member 14 is provided with a plurality of interrupted, circumferentially spaced threads, cams or lugs without a lead angle and generally identified as FT. As shown there are axial series of threads identified as 46, 48, and 50 and a series of stop threads 52. The threads 46, 48, and 50 are axially aligned with one another and each has an extent or length substantially equal to the arc defined by a central angle of about 30 degrees. The threads in each series are spaced a substantially equal distance apart, ie., the spacing is an arc defined by a central angle of about 30 degrees. The threads 46 are positioned at or closely adjacent to the terminal end 26 of the member 14. Next to the threads 46 are the stop lugs 52 with one end aligned with the ends of the threads 46, 48, and 50 of a series. The stop lugs 52 are spaced a small axial distance from the threads 46 and a distance substantially equal to the width of the threads from the threads 48. The threads 48 and 50 are also so axially spaced. Each of the threads 38, 40, 42, 46, 48, and 50 are substantially equal in length, circumferential thickness and axial width. As illustrated, each of the stop lugs are substantially equal in length and width.

Each of the stop lugs 44 and 52 has an end face surface 54, 56, respectively, which when the joint is made, engage one another. These surfaces 54, 56 are angled with respect to an axial plane; however, they could be axial if so desired. The other end surfaces 58, 60 are such to limit the rotation of the male member to one direction, as will be apparent as the description progresses.

While the stop lugs are illustrated as being separate from the next adjacent thread, it is to be understood that the next adjacent thread and lug could be made integral, without a spacing, if so desired.

As is illustrated in FIGS. 10 and 11, and also partly in FIG. 1, the cementing head 10 is constructed with a latch means L which cooperates with slots 62 in the coupling 16. These latching means prevent relative rotation (and uncoupling of the parts) when cementing a casing. The slots are spaced apart in the same fashion as are the threads, ie., they have a length of about 30°. The coupling of the cementing head is provided with diametrically opposed spaced latch supports 64, 64 to which is pivoted a substantially T-shaped latch 66. The pivot is provided by a boly-nut arrangement 68. The latch 66 has a head portion 70 which is received in a slot 62 and when so received is locked by means of a pin 72 which passes through openings 74 in the supports and an opening 76 in the latch 66. To prevent loss of the pin 72, it is connected to the head 10 by a chain 78. Also, spaced, spring pressed detent means 80 are provided to latch the latch 66 in its operative position or in its non-operative position in which the head 70 is out of engagement with the slot 62. While there are two such latching means indicated, there may be few or more without departing from the spirit of the inventions.

OPERATION

The cementing head 10 is lowered over the male member and when the parts 24, 26 meet, the male member is fully seated in the female member. There are, according to the preferred embodiment, six positions for seating the male member with respect to the female member, ie., when the threads MT and FT are aligned for relative movement of the members axially with respect to one another. It is to be understood that different circumferential spacings of the threads can be provided, if desired.

When fully seated, the cementing head 10 is rotated 30°, so that the surfaces of the threads 59 engage the adjacent surfaces of the threads 38 and 40; the surfaces of the threads 48 engage the adjacent surfaces of the threads 40 and 42; one surface of the stop lugs 52 engage the adjacent surface of the threads 42 and the surfaces of the threads 46 engage the adjacent surfaces of the stop lugs 44 and the shoulder 24 of the member 16.

The surfaces 54 and 56 of the stop lugs 44 and 52 engage one another, thus limiting rotation.

When fully seated and rotated, an operator moves the latches 66 about the pivot to seat the head 70 in a slot 62, thus locking the head in operating position. Cement can then be fed to the head for cementing the casing.

When cementing is completed, the latches are unlatched and the head is rotated in the opposite direction. The amount of rotation is limited by the faces 58, 60, of the stop lugs engaging one another. When this occurs, the cementing head can then be lifted and removed.

I claim:

1. In a joint, the combination comprising:
a male cylindrical member;

a female cylindrical member;
said male member being insertable into the female member a predetermined distance;
a plurality of axially spaced and circumferentially interrupted threads on each member which mesh with one another upon rotation of one of said members to releasably couple said members together; and
circumferentially spaced stop lugs on each of said members which are circumferentially aligned with one another when said male member is at said predetermined distance in said female member to limit the rotation of said members relative to one another to a portion of a revolution equal in distance to the length of one of said threads, and to permit rotation of said members relative to the other in one direction only for coupling said members and in the opposite direction only for uncoupling said members; and wherein stop lugs on each of said members are threadedly engaged with the threads on the other of said members when said members are releasably coupled together to thereby augment the interengaged surface area of said members and thus the strength of the joint.

2. In a joint as defined in claim 1 wherein said threads are generally rectangular in section and have no lead angle.

3. In a joint as defined in claim 1 wherein each said stop lugs have a complementary surface which engage one another when said members are coupled.

4. In a joint as defined in claim 1 wherein the length of said stop lugs is smaller than the length of said threads.

5. In a joint as defined in claim 1, further comprising latching means cooperating with said male and female members for latching said members against rotation for uncoupling when said members are coupled.

6. In a joint as defined in claim 5 wherein said latching means comprises a pivotable member connected to said female member and having a projecting portion, and a slot means in said male member to receive said projecting portion of said pivotable member.

7. A joint for connecting a cementing head to a casing comprising:
a female section connected to said cementing head and a male section connected to said casing;
a plurality of axially spaced and circumferentially interrupted threads without a lead angle on each section so arranged to mesh with one another upon insertion of said male section into said female section to a predetermined distance and rotation of said cementing head relative to said casing when so positioned to releasably connect said head to said casing; and
circumferentially spaced stop lugs on each section which are circumferentially aligned with one another when said male section is inserted to said predetermined distance in said female section, said stop lugs limiting the rotation of said cementing head in one direction only for connecting said head and casing and in the opposite direction only for disconnecting said head and casing, said stop lugs being of lesser length than said threads and each having surfaces which limit the amount and direction of rotation of the cementing head relative to the casing; and
wherein said stop lugs on each of said members are threadedly engaged with the threads on the other of said members when said members are releasably coupled together to thereby augment the interengaged surface area of said members and thus the strength of the joint.

8. In a joint, the combination comprising:
a male cylindrical member;
a female cylindrical member;
said male member being insertable into the female member a predetermined distance;
a plurality of series of axially spaced and aligned and circumferentially interrupted threads on each member which mesh with one another upon rotation of one of said members to releasably couple said members together; and
circumferentially spaced stop lugs on each of said members which are circumferentially aligned with one another when said male member is at said predetermined distance in said female member to limit the rotation of said members relative to one another to a portion of a revolution equal in a distance to the length of one of said threads, and to permit rotation of said members relative to the other in one direction only for coupling said members and in the opposite direction only for uncoupling said members, one end of each of said stop lugs being axially aligned with one end of the threads in a series and each said stop lug is about one half the length of each thread; and
wherein said stop lugs on each of said members are threadedly engaged with the threads on the other of said members when said members are releasably coupled together to thereby augment the interengaged surface area of said members and thus the strength of the joint.

9. In a joint as defined in claim 8 wherein said threads are generally rectangular in section and have no lead angle.

10. In a joint as defined in claim 8 wherein each said stop lugs have a complementary surface which engage one another when said members are coupled.

11. A joint for connecting a cementing head to a casing comprising:
a female section connected to said cementing head and a male section connected to said casing;
a plurality of series of axially spaced and aligned and circumferentially interrupted threads without a lead angle on each section so arranged to mesh with one another upon insertion of said male section into said female section to a predetermined distance and rotation of said cementing head relative to said casing when so positioned to releasably connect said head to said casing; and
circumferentially spaced stop lugs having no lead angle on each section which are circumferentially aligned with one another when said male section is inserted to said predetermined distance in said female section, said stop lugs limiting the rotation of said cementing head in one direction only for connecting said head and casing and in the opposite direction only for disconnecting said head and casing, said stop lugs being of approximately one half the length of said threads and each having surfaces which limit the amount and direction of rotation of the cementing head relative to the casing; and
wherein said stop lugs on each of said members are threadedly engaged with the threads on the other of said members when said members are releasably coupled together to thereby augment the interengaged surface area of said members and thus the strength of the joint.

12. A joint as recited in claim 11 in which said threads and stop lugs are generally rectangular in section.

13. A joint as recited in claim 12 further including latching means associated with said male and female sections and comprising a pivotable member attached to said female section and having a projection thereon, a slot means in said male member, said projection being received in said slot means when said members are coupled together and preventing rotation of said members relative to one another for uncoupling said members.

14. A joint as recited in claim 13 further including releasable locking means for releasably locking said latch means in latching position.

* * * * *

PO-1050
(5/69)

UNITED STATES PATENT OFFICE
CERTIFICATE OF CORRECTION

Patent No. 3,922,009            Dated November 25, 1975

Inventor(s) Ben F. Giebeler

It is certified that error appears in the above-identified patent and that said Letters Patent are hereby corrected as shown below:

Col. 4, line 20, "boly-nut" should be --bolt-nut--.
Col. 4, line 46, "59" should be --50--.

Signed and Sealed this

Fifth Day of October 1976

[SEAL]

Attest:

RUTH C. MASON
*Attesting Officer*

C. MARSHALL DANN
*Commissioner of Patents and Trademarks*